Figure 1:
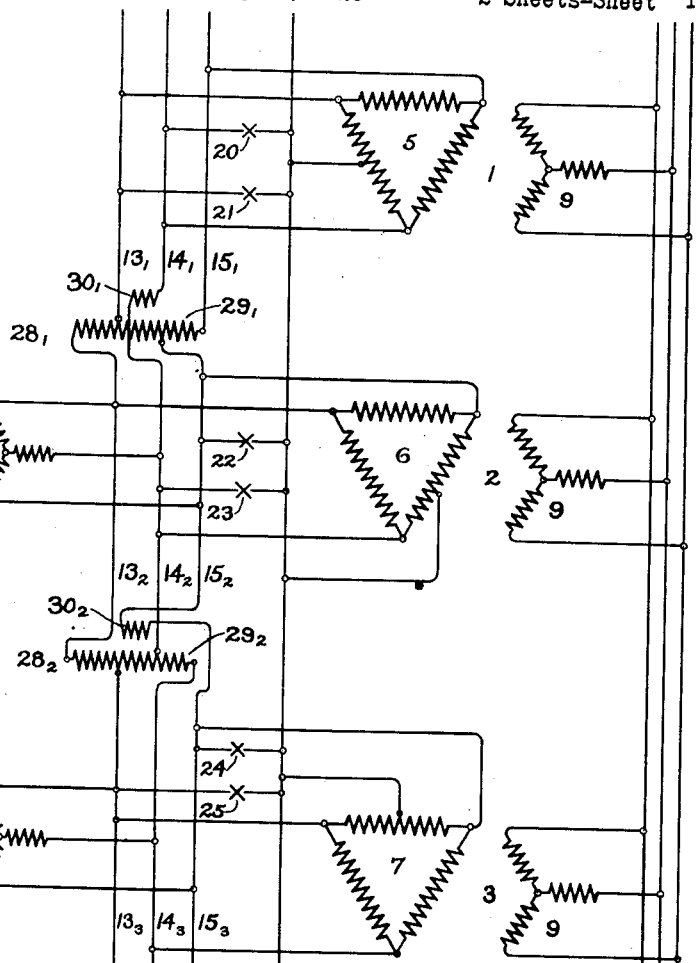

June 12, 1928.

J. C. PARKER 1,673,635

SYSTEM OF DISTRIBUTION

Filed July 22, 1925  2 Sheets-Sheet 1

Inventor:
John C. Parker,
by Alexander S. ——
His Attorney.

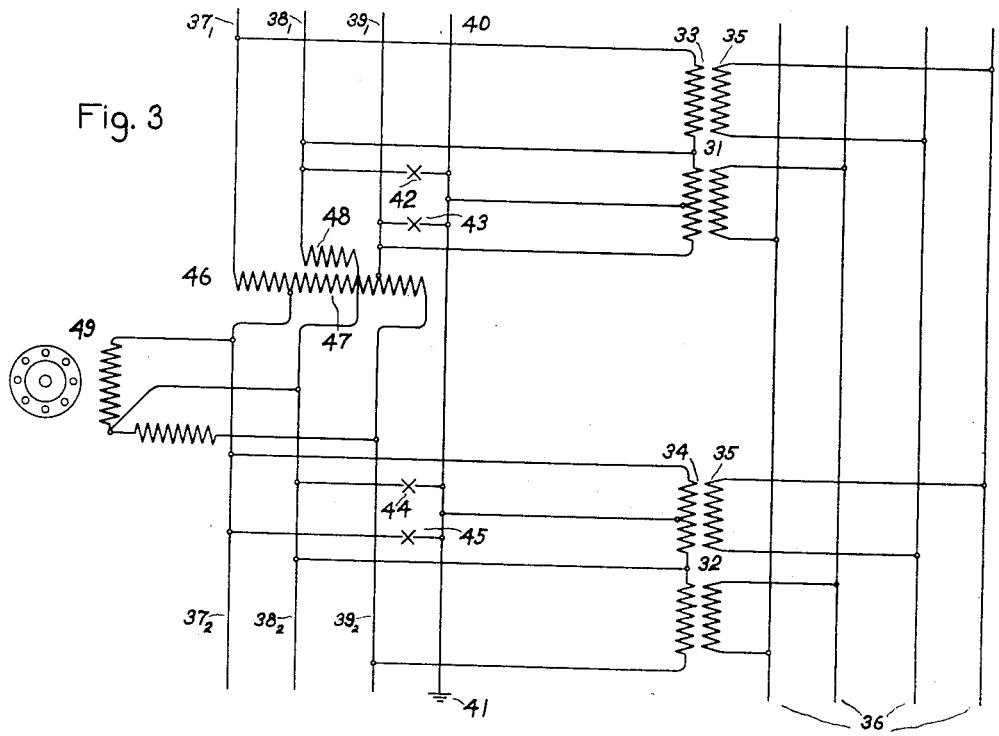
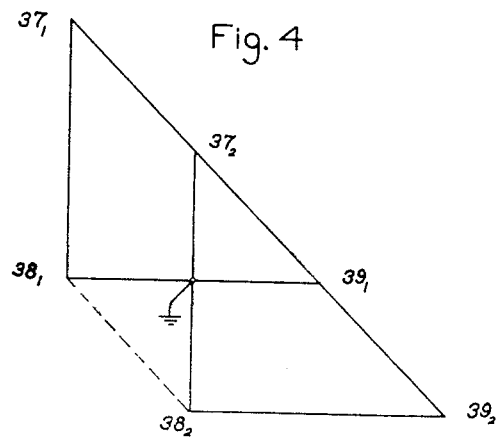

Patented June 12, 1928.

1,673,635

UNITED STATES PATENT OFFICE.

JOHN C. PARKER, OF BROOKLYN, NEW YORK, ASSIGNOR TO GENERAL ELECTRIC COMPANY, A CORPORATION OF NEW YORK.

SYSTEM OF DISTRIBUTION.

Application filed July 22, 1925. Serial No. 45,403.

My invention relates to systems of distribution and especially to polyphase secondary networks from which current may be supplied at suitable voltages to both single and polyphase load devices without producing the objectionable load unbalancing which has characterized the supply of single phase current from a polyphase system in the past.

In the distribution of power it is frequently desirable to provide some form of polyphase secondary network from which both lights and polyphase motors may be supplied with current. Either the two-phase five-wire system, or the three-phase four-wire system may be used for this purpose but in the operation of each of these well known systems there are involved certain difficulties. The two-phase system requires five conductors thereby necessitating high first cost, and labors under the further disadvantages that it requires the use of two-phase motors which are not commonly used for power purposes. The Y-connected four-wire network, on the other hand, is not adapted to produce at the same time voltages which have become standard for lights and motors. With 120 volts to neutral, the phase voltage of the network will be approximately 208 which is too low for motors, and if the voltage to neutral is raised it will be in excess of the standard lamp voltage.

In the case of delta-connected transformer secondary windings the line voltage of the network is the same as that of the winding and by connecting the lighting circuits between the mid-point and ends of one of the transformer windings it is possible to operate lamps at 120 volts from a 240 volt three-phase net-work. The necessity of grounding one side of each of the lighting circuits, however, precludes their connection to more than one phase of the low voltage network, thereby unbalancing the load on the three-phase feeders through which power is supplied. In order to overcome this difficulty, the low voltage network is divided into sections and the single phase loads of adjacent sections are connected to different phases of the system. This requires grounding of the mid-point of different phases in adjacent districts which means that the voltage of each phase to ground differs from one district to the next. The voltage difference between the corresponding phases of adjacent sections has in the past precluded their interconnection on the low voltage side of the transformers through which they are supplied with power. Such interconnection, however, is very desirable both with respect to insuring continuity of service in case one of the transformers fails to function and to facilitating an exchange of current between the various sections under normal operating conditions.

An object of my invention is to provide a system of distribution in which the low voltage network may be interconnected to form a unitary system and which is adapted to supply both single and polyphase power at suitable voltages.

A further object is to provide means for interconnecting two polyphase systems which have their corresponding phases at different voltages to ground.

My invention will be better understood from the following description taken in connection with the accompanying drawing, and its scope will be pointed out in the accompanying claims.

Figure 2:
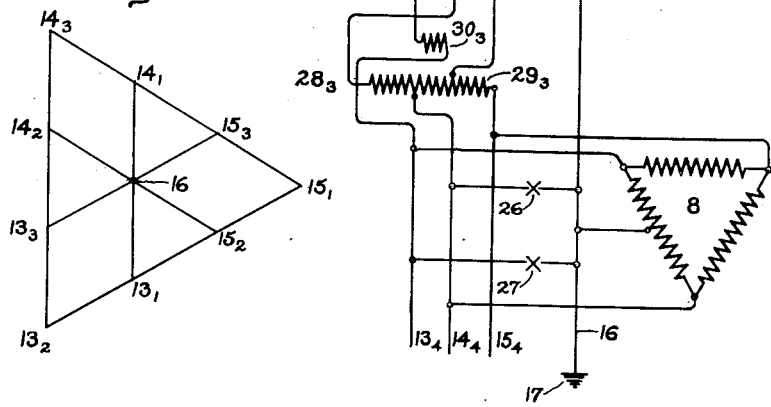

Referring now to the drawing, Fig. 1 illustrates a three-phase low voltage distribution system in which my invention has been embodied, Fig. 2 is a vector diagram showing the relation between the voltages of adjacent sections of the three-phase low voltage network, Fig. 3 illustrates a four-wire two-phase low voltage distribution system in which my invention has been embodied, and Fig. 4 is a vector diagram showing the relation between the voltages of adjacent sections of the low voltage net work.

Fig. 1 shows a plurality of polyphase transformers 1, 2, 3 and 4 provided with secondary windings 5, 6, 7 and 8 respectively, and with primary windings 9 arranged to be supplied with current from a high voltage line 10. These three transformers may or may not be of equal rating depending on the load each is required to carry. Arranged to be supplied with current from the secondary windings 5, 6, 7 and 8 is a low voltage network consisting of conductors $13_1$, $14_1$, $15_1$, $13_2$, $14_2$, $15_2$, etc. and a neutral conductor 16 grounded as indicated at 17. This network may comprise any desired number of sections each arranged to transmit current to polyphase load devices at 240 volts, as indicated by the motors 18 and 19, and to single phase load devices at 120 volts, as indicated by the lighting circuits 20 to 27 inclusive, connected from the neutral wire 16 to various conductors of the network. For purposes of illustration I have shown the network as composed of four sections, the section $13_1$, $14_1$, $15_1$ being connected to the transformer winding 5, the section $13_2$, $14_2$, $15_2$ to the winding 6, the section $13_3$, $14_3$, $15_3$ to the winding 7, and the section $13_4$, $14_4$, $15_4$ to the winding 8. In order to afford a supply of current at 120 volts, each transformer secondary winding has one of its phases grounded through its connection with the neutral conductor 16, and for the purpose of distributing the single phase load among the various phases of the system the connection to the neutral conductor is made to a different phase of each successive winding. This arrangement involves grounding of the mid point of different phases in adjacent sections which means that the voltage of each phase to ground differs from one section or district to the next and precludes the connection of adjacent sections to each other unless means are provided for insuring the proper voltage relation between the corresponding conductors of the sections.

In order to permit interconnection of the sections I have provided a special type of transformer 28, which I call a translator, three of which are shown in the drawing, and which may be designed with a high reactance to maintain the voltage on the other sections in case one of the sections is short-circuited. This transformer comprises a core on which are wound a winding 29 arranged to function as an auto transformer and a series winding 30 inductively related to the winding 29 and connected in series between two corresponding conductors of adjacent sections. The operation of this transformer will be better understood upon reference to Fig. 2, which is a vector diagram showing the relation between the voltages of the different sections. In this figure the respective phases are denoted by 13, 14 and 15 and the districts by the subscripts 1, 2, 3 and 4. In the first district the midpoint of the phase $13_1$—$14_1$ is grounded, in the second district the midpoint of phase $14_2$—$15_2$, in the third district that of phase $13_3$—$15_3$ and in the fourth district that of phase $13_4$—$14_4$.

At the boundary between districts 1 and 2, for example, the potential of the corresponding wires $13_1$ and $13_2$ differ by a single phase voltage of 120 volts due to the fact that different phases of the transformers 1 and 2 are grounded. The same is true of wires $14_1$ and $14_2$ and of wires $15_1$ and $15_2$. As shown, by the vector diagram these voltage differences are equal not only in magnitude but are also in phase with each other. Thus at each boundary between two sections the corresponding voltages of the network are identical both as to phase and value although the potential of each to ground differs from section to section.

The transformers 28 are designed to maintain a single phase voltage difference between the districts and at the same time to permit the transfer of power from one district to another. Each transformer 28 is built with four coils, three of which are connected together as an auto-transformer winding 29 and the fourth of which is inductively related to the auto-transformer winding 29 and will be referred to hereinafter as the series coil 30. To join districts 1 and 2 the wires $13_1$, $13_2$, $15_1$ and $15_2$ are connected to the terminals of the auto transformer, as indicated in the drawing. Under these conditions an induced single phase potential of 120 volts is provided between the corresponding conductors $13_1$ and $13_2$, as will be apparent on reference to the vector diagram. This arrangement also provides for a like difference between the corresponding conductors $15_1$ and $15_2$. The voltages $13_1$—$15_1$ in section 1 and $13_2$—$15_2$ in section 2 therefore differ only with respect to their potential to ground. Conductors $14_1$ and $14_2$ are connected to the terminals of the series winding 30 which is so related to the auto-transformer winding 29 as to have induced in it by excitation from the phases $13_1$—$15_1$, and $13_2$—$15_2$ a potential of 120 volts in phase with the voltages $13_1$—$15_1$ and $13_2$—$15_2$, thereby providing for the required potential difference between conductors $14_1$ and $14_2$. Likewise between each section of the network the translator 28 maintains a single voltage difference of 120 volts which permits a distribution of the load between the various phases of the system and permits the transfer of power from one district to another.

It will of course be understood that if the single phase load in each section is evenly divided between the two sides of the grounded phase of the main transformer secondary circuit, the middle section of the coil 28 may be omitted, this part of the coil being required only to afford a path for the transmission of a current having a magnitude equal to the difference between the currents in the two parts of the grounded phase. For this reason the middle section of each coil 28 may be designed with a much lower current rating than that of the two end sections of this coil.

Fig. 3 shows my invention embodied in a two-phase system in which a plurality of two-phase transformers 31 and 32 provided with secondary windings 33 and 34 respectively and with primary windings 35 are arranged to be supplied with current from a high voltage line 36. Arranged to be supplied with current from the secondary windings 33 and 34 is a low voltage network consisting of conductors $37_1$, $38_1$, $39_1$, and $37_2$, $38_2$, $39_2$, and a neutral conductor 40 grounded as indicated at 41. This network may comprise any desired number of districts or sections each arranged to transmit current to two-phase load devices at 240 volts, as indicated by the motor 49, and to single phase load devices at 120 volts, as indicated by the lighting circuits 42, 43, 44 and 45 connected from the neutral wire 40 to various conductors of the network. For purposes of illustration, I have shown the network as composed of two sections, the section $37_1$, $38_1$, $39_1$ being connected to the transformer winding 33 and the section $37_2$, $38_2$ and $39_2$ to the winding 34. In order to afford a supply of current at 120 volts, each transformer secondary winding has one of its phases grounded through its connection with the neutral conductor 40, and for the purpose of distributing the single phase load among the various phases of the system, the connection to the neutral conductor is made to a different phase of the second section. This arrangement involves grounding of the neutral of different phases in adjacent sections, which means that the voltage of each phase to ground differs from one section or district to the next and precludes the connection of adjacent sections to each other, unless means are provided for insuring proper voltage relations between corresponding conductors of the sections. In order to permit interconnection of the sections, a voltage modifying device 46, referred to as a translator, and taking the form as shown of an autotransformer, is arranged to interconnect the adjacent sections. This transformer comprises a core on which are wound a winding 47 arranged to function as an autotransformer and a series winding 48 inductively related to the winding 47 and connected in series between two corresponding conductors of adjacent sections.

The operation of this voltage modifying means will be better understood upon reference to Fig. 4 which is a vector diagram showing the relation between voltages of the different sections. In this figure the respective phase conductors are denoted by 37, 38 and 39, and the districts by the subscripts 1 and 2. In the first district, the midpoint of the phase $38_1$—$39_1$ is grounded, and in the second district the midpoint of phase $37_2$—$38_2$ is grounded. At the boundary between the districts the potential of the corresponding wires $37_1$ and $37_2$ differs by a single phase voltage of approximately 170 volts. The same is true of wires $38_1$ and $38_2$ and of wires $39_1$ and $39_2$. As shown by the vector diagram, these voltage differences are equal not only in magnitude but are also in phase with each other.

The transformers 46 are designed to maintain a single phase voltage difference between districts and at the same time permit the transfer of power from one district to another. Each transformer in this particular case is built with four coils, three of which are connected together as an autotransformer 47 and the fourth of which is inductively related to the autotransformer and will be referred to hereinafter as the series coil 48. To join the districts shown, the wires $37_1$, $39_1$, and $37_2$ and $39_2$ are connected to the terminals of the autotransformer as indicated in the drawing. Under these conditions an induced single phase potential of 170 volts is provided between corresponding conductors $37_1$ and $37_2$ as will be apparent on reference to the vector diagram. This arrangement also provides for a like difference between the corresponding conductors $39_1$ and $39_2$. The voltages $37_1$—$39_1$ in section 1, and $37_2$—$39_2$ in section 2 therefore differ only with respect to their potential to ground. Conductors $38_1$ and $38_2$ are connected to the terminals of the series winding 48, which is so related to the autotransformer winding 47 as to have induced in it excitation from phase $37_1$—$39_1$ and $37_2$—$39_2$ a potential of 170 volts in phase with voltage $37_1$—$39_1$ and $37_2$—$39_2$ thereby providing for the required potential difference between conductors $38_1$ and $38_2$. Similar districts may be added with a translator 46 interconnecting the districts and arranged in a manner which will be obvious from the preceeding description so as to maintain the proper voltage difference between corresponding conductors to permit a distribution of the load by the various phases of the system and permit the transfer of power from one district to another.

What I claim as new and desire to secure by Letters Patent of the United States, is:—

1. A system of distribution wherein a low voltage network arranged in sections each connected to the secondary winding of a different polyphase transformer is adapted to transmit current to both single and polyphase load devices and wherein the transformer secondary windings connected to adjacent sections each have a different phase winding grounded at a point intermediate its ends, characterized by the fact that voltage modifying means are provided for interconnecting adjacent sections of said low voltage network to permit the transfer of power from one section to another.

2. A system of the class described comprising a low voltage network arranged in sections, a plurality of polyphase transformers each having a different phase winding grounded at a point intermediate its ends and each arranged to transmit current to a different one of said sections, and a translator for interconnecting said sections.

3. A system of the class described comprising a plurality of polyphase transformers, a low voltage network arranged in sections each in conductive relation with a different transformer, the transformers connected to adjacent sections having different phases of their secondary windings grounded at a point intermediate the ends, and transforming means for interconnecting said sections.

4. A system of the class described comprising a plurality of polyphase transformers, a low voltage network arranged in sections each in conductive relation with a different transformer, the transformers connected to adjacent sections having different phases of their secondary windings grounded at a point intermediate the ends, and means including an auto tranformer for interconnecting said sections.

5. A system of the class described comprising a plurality of polyphase transformers, a low voltage network arranged in sections each in conductive relation with a different transformer, the transformers connected to adjacent sections having different phases of their secondary windings grounded at a point intermediate the ends, and means including an auto transformer and a coil inductively related to said auto transformer for interconnecting adjacent sections, the arrangement being such that a part of the conductors in one section are connected to the corresponding conductors in the adjacent section through said coil and the remaining conductors in one section are connected to the corresponding conductors of the adjacent section through said auto transformer.

6. A three phase system of distribution comprising a plurality of transformers, a low voltage network arranged in sections each conductively related to a different transformer, the transformers connected to adjacent sections having different phases of their secondary windings grounded at a point intermediate the ends, and means including an auto transformer and a coil inductively related to said auto transformer for interconnecting the corresponding conductors of adjacent sections.

7. A three phase system of distribution comprising a plurality of transformers, a low voltage network arranged in sections each conductively related to a different transformer, the transformers connected to adjacent sections having different phases of their secondary windings grounded at a point intermediate the ends, and means including an auto transformer and a coil inductively related to said auto transformer for interconnecting the corresponding conductors of adjacent sections, a conductor in one section being connected through said coil to a corresponding conductor in the adjacent section.

8. A three phase system of distribution comprising a plurality of transformers, a low voltage network arranged in sections each conductively related to a different transformer, the transformers connected to adjacent sections having different phases of their secondary windings grounded at a point intermediate the ends, and means including an auto transformer and a coil inductively related to said auto transformer for interconnecting the corresponding conductors of adjacent sections, two conductors in one section being connected through said auto transformer to the two corresponding conductors in the other section and a third conductor in one section being connected through said coil to the corresponding conductor in the other section.

9. A polyphase system of distribution comprising a plurality of transformers, a low voltage network arranged in sections each conductively related to a different transformer, the transformers connected to adjacent sections having different phases of their secondary windings grounded at a point intermediate the ends, single phase load devices connected between the grounded point and a terminal of said windings, polyphase load devices conductively related to the terminals of said secondary windings, and means for interconnecting the corresponding conductors of adjacent sections.

In witness whereof, I have hereunto set my hand this eighteenth day of July, 1925.

JOHN C. PARKER.